United States Patent
Lin et al.

(10) Patent No.: US 7,167,361 B2
(45) Date of Patent: Jan. 23, 2007

(54) COMPUTER INTERFACE CARD (75) Inventors: Ta-Chun Lin, Taipei (TW); Yung-Da Lin, Taipei (TW); Ju-Wei Tsai, Taipei (TW)

(73) Assignee: Avermedia Technologies, Inc., Taipei County (TW)

( * ) Notice: Subject to any disclaimer, the term of this patent is extended or adjusted under 35 U.S.C. 154(b) by 17 days.

(21) Appl. No.: 11/138,379

(22) Filed: May 27, 2005

(65) Prior Publication Data

US 2006/0158843 A1    Jul. 20, 2006

(30) Foreign Application Priority Data

Jan. 20, 2005    (TW)    .............................. 94101704 A (51) Int. Cl.
*G06F 1/16*    (2006.01)
*H01R 12/16*    (2006.01)

(52) U.S. Cl. ...................... 361/685; 710/301; 439/76.1; 361/789

(58) Field of Classification Search ........ 361/679–687, 361/724–727, 752, 785, 777, 789; 439/76.1; 710/301, 72, 62
See application file for complete search history.

(56) References Cited

U.S. PATENT DOCUMENTS 6,239,973 B1    5/2001    Taylor et al.
6,276,965 B1 *  8/2001    Madsen et al. ............. 439/607
6,813,164 B1 * 11/2004    Yen ............................. 361/785
2006/0172562 A1 * 8/2006    Weidner ....................... 439/63

FOREIGN PATENT DOCUMENTS

TW    578336    3/2004
TW    M242955    9/2004

* cited by examiner

Primary Examiner—Hung Van Duong
(74) Attorney, Agent, or Firm—Birch, Stewart, Kolasch & Birch, LLP (57)    ABSTRACT A computer interface card including a circuit board, a first connector, a second connector, several first conductors, a second conductor, a third conductor, a cover and a base is provided. The first connector is disposed on one side of the circuit board to be electrically connecting to a cable. The second connector, which is disposed on the opposite side of the circuit board, is electrically connected to the first connector and a third connector of a computer. The signal transmitting interface between the second connector and the third connector includes a PCMCIA, a Card Bus or an Express Card Bus interface. The cover and the bottom cover are buckled together to retain the circuit board. The cover and the base have a metal cover and a metal base respectively, wherein the metal cover is electrically connected to the first conductors and the metal base.

19 Claims, 6 Drawing Sheets

COMPUTER INTERFACE CARD

This application claims the benefit of Taiwan application Ser. No. 94101704, filed Jan. 20, 2005, the subject matter of which is incorporated herein by reference.

BACKGROUND OF THE INVENTION

1. Field of the Invention

The invention relates in general to a computer interface card, and more particularly to a computer interface card which not only prevents computer noises from being carried away from the computer by the cable then built-up on the cable but also prevents the cable from causing electromagnetic interference (EMI) problem.

2. Description of the Related Art

Living in today's society where science and technology advance rapidly, computer has become an indispensable tool to modern people in their everyday life. Since computer can only play digital AV signals, the analog TV AV signals outputted by TV station cannot be played on the computer directly. Thus, an AV signal conversion device is invented to convert the analog TV AV signals into digital AV signals to be played on the computer directly Widely used AV signal conversion device such as TV turner card, which is also called TV capture card, enables the user to view TV signals on computer screen via the TV card. However, ordinary TV cards, which are PCI interface and are mainly used in desktop computer, do not support hot plug function. On the another hand, a new TV card, which is mainly used in notebook computer, is a PCMCIA, a Card Bus or an Express Card Bus interface such as the TV capture card disclosed in Taiwanese Patent Publication No. M242955. The TV capture card receives a TV signal via the TV cable and further converts the received TV signal into an AV signal which can be played on a notebook computer directly.

However, the TV cable being a sensitive noise transmission path would create antenna effect when the TV cable is of a certain length. Thus, the noises of the notebook computer would be easily carried away by the TV cable via the TV card then built-up on the TV cable, causing electromagnetic interference (EMI) problem, thus failing to meet the required standards. Other electronic products, which use a PCMCIA, a Card Bus or an Express Card Bus interface, such as the computer interface card connecting the cable, would face the same EMI problem when the noises are carried away from the computer by the cable then built-up on the cable.

SUMMARY OF THE INVENTION

It is therefore an object of the invention to provide a computer interface card. The design for the grounding end of the circuit board, the upper conductor, the metal cover, the metal base, the lower conductor and the metal slot wall to be mutually and electrically connected shortens the return path of the computer noises and reduces the radiation of EMI via the cable, so that the noises are guided back to the computer on the computer interface card. Moreover, the design of the invention for the connector, the upper conductor, the upper metal cover, the lower metal base, the lower conductor and the metal slot wall to be mutually and electrically connected enables the EMI radiation to be guided back to the computer before being radiated via the cable. The above practice not only prevents the computer noises from being carried away from the computer by the cable and being built up on the computer, but also prevents the cable from causing EMI problem, thus complying with the required standards.

According to an object of the invention, a computer interface card comprising a circuit board, a first connector, a second connector, a number of first upper conductors, a second upper conductor, a third upper conductor, a cover and a base is provided. The circuit board has an upper surface and a lower surface. The first connector is disposed on one side of the circuit board to be electrically connected to a cable. The second connector is disposed on the opposite side of the circuit board to be electrically connected to a third connector and a first connector of a computer. The signal transmitting interface between the second connector and the third connector comprises a PCMCIA, a Card Bus or an Express Card Bus interface. The first upper conductors are disposed on the upper surface of the circuit board to be electrically connected to the grounding end of the circuit board. The second upper conductor is disposed on the metal shell of the first connector to be electrically connected to the metal shell of the first connector. The cover and the base are buckled together to retain the circuit board and expose part of the first connector and the second connector. The cover has an upper metal cover and an upper insulating cover while the base has a lower metal base corresponding to the upper metal cover and a lower insulating base corresponding to the upper insulating cover. The upper metal cover is electrically connected to the first upper conductors and the lower metal base. The third upper conductor is disposed on the inner surface of the upper insulating cover to be electrically connected to the upper metal cover and the second upper conductor.

According to another object of the invention, a computer interface card comprising a circuit board, a first connector, a number of first upper conductors, a cover and a base is provided. The circuit board has an upper surface and a lower surface. The first connector is disposed on one side of the circuit board to be electrically connected to a second connector of a computer. The signal transmitting interface between the first connector and the second connector comprises a PCMCIA, a Card Bus or an Express Card Bus interface. The first upper conductors are disposed on the upper surface of the circuit board to be electrically connected to the grounding end of the circuit board. The cover and the base are buckled together to retain the circuit board and expose part of the first connector. The cover has an upper metal cover and an upper insulating cover, while the base has a lower metal base corresponding to the upper metal cover and a lower insulating base corresponding to the upper insulating cover. The upper metal cover is electrically connected to the first upper conductor and the lower metal base.

According to yet another object of the invention, a computer interface card comprising a circuit board, a first connector, a first upper conductor, a second upper conductor, a cover and a base is provided. The circuit board has an upper surface and a lower surface. The first connector is disposed on one side of the circuit board to be electrically connected to a cable. The first upper conductor is disposed on the metal shell of the first connector to be electrically connected to the metal shell of the first connector. The cover and the base are buckled together to retain the circuit board and expose part of the first connector. The cover has an upper metal cover and an upper insulating cover, while the base has a lower metal base corresponding to the upper metal cover and a lower insulating base corresponding to the upper insulating cover. The upper metal cover is electrically connected to the lower metal base. The second upper conductor is disposed on the inner surface of the upper insulating cover to be electrically connected to the upper metal cover and the second upper conductor.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1:
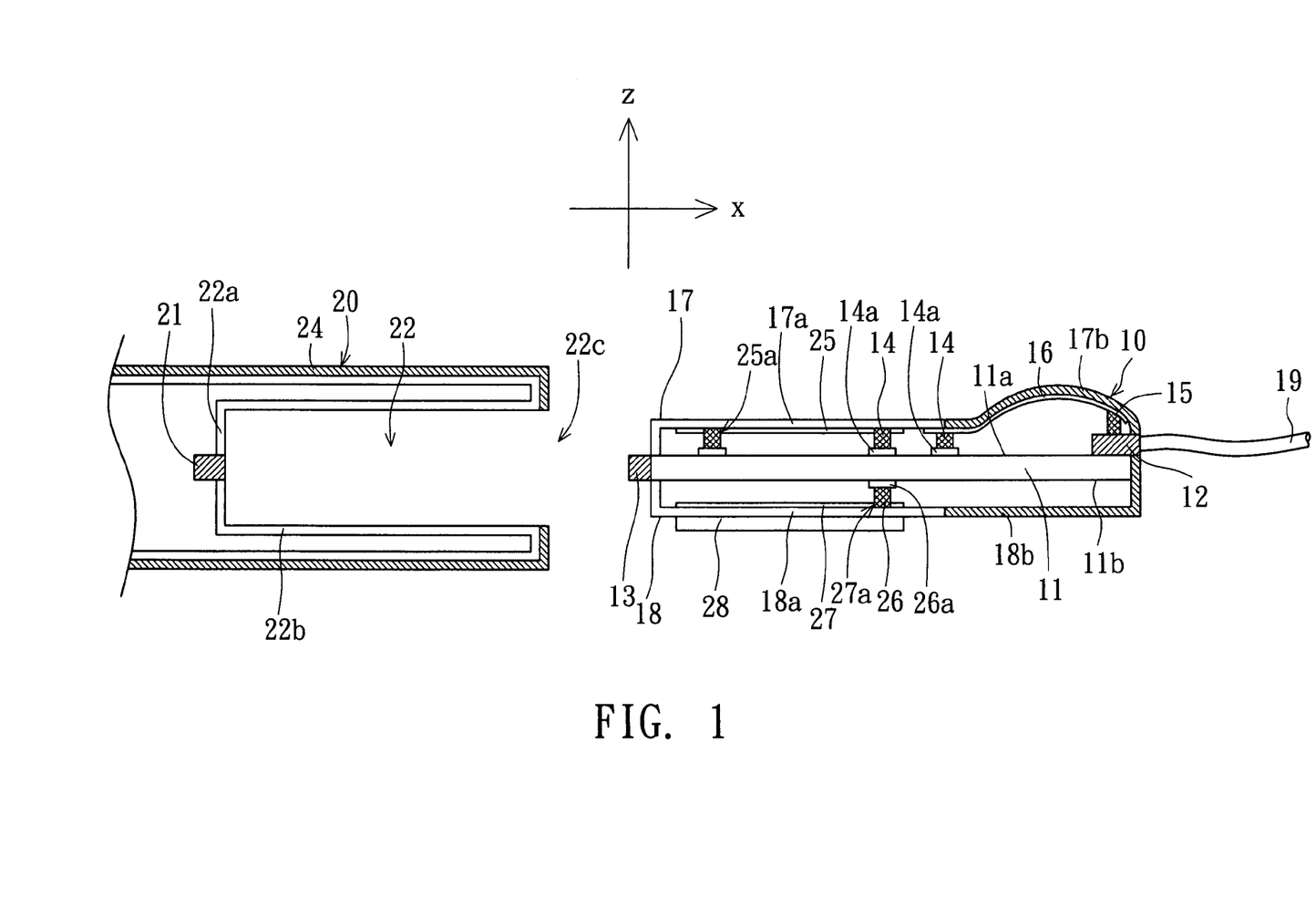
FIG. 1 is a cross-sectional disassembly diagram of a computer interface card and a computer according to a first embodiment of the invention.
Figure 2:
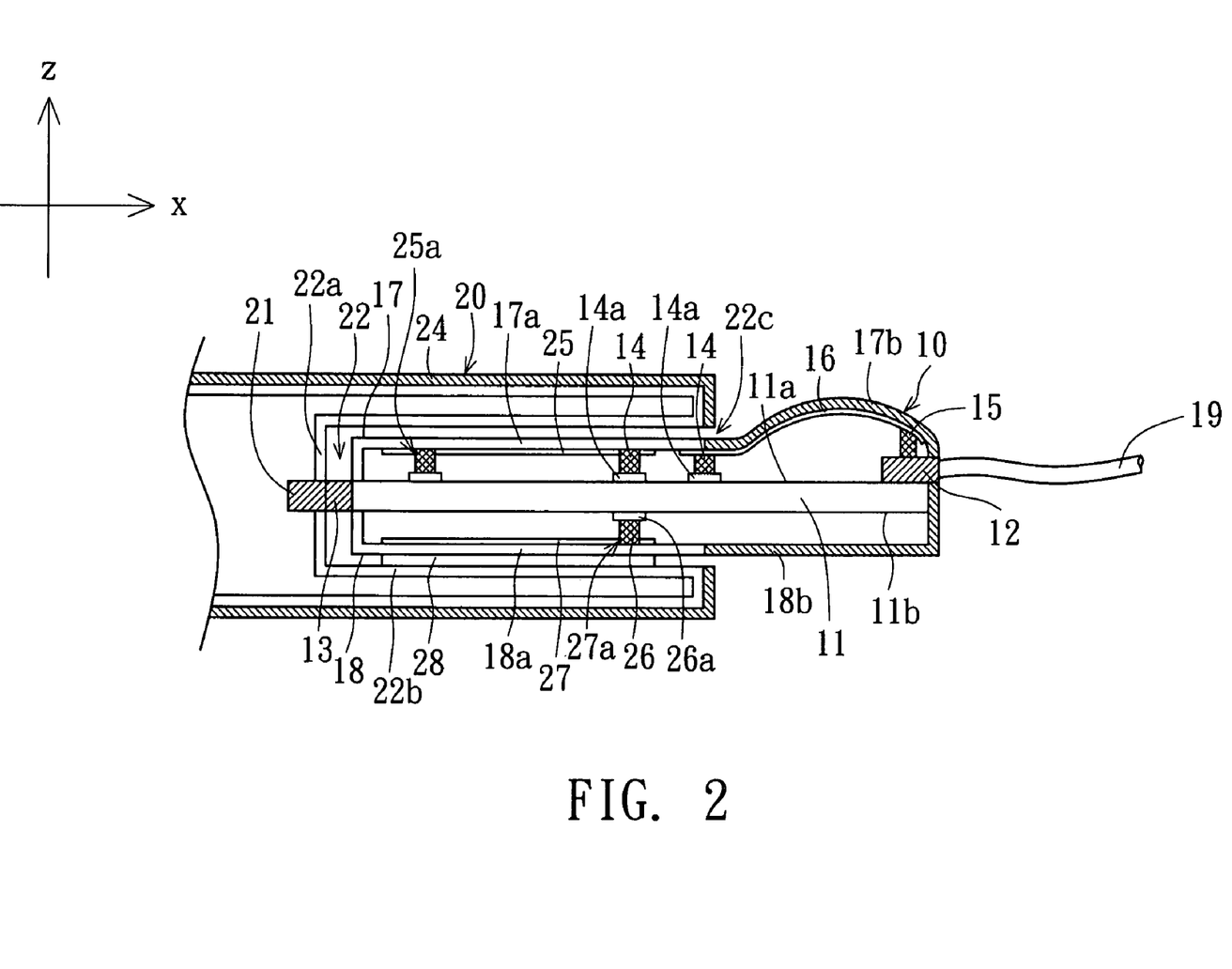
FIG. 2 is a cross-sectional assembly diagram of a computer interface card and a computer according to a first embodiment of the invention.
Figure 3:
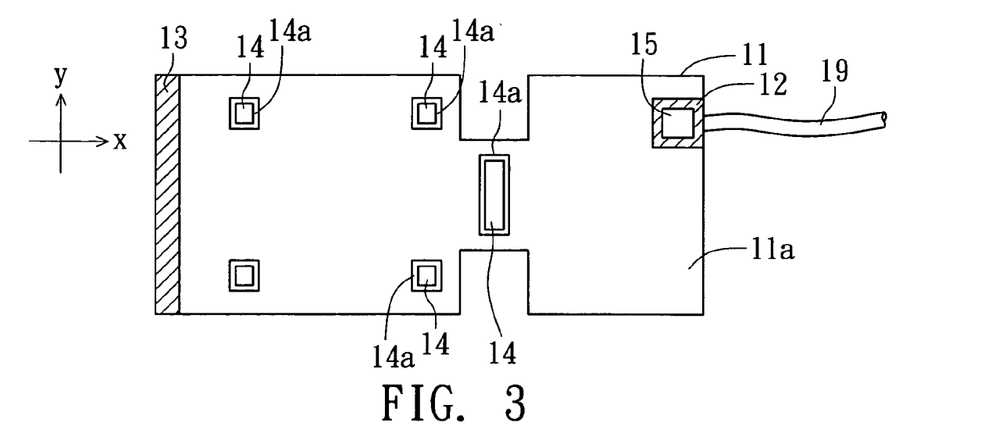
FIG. 3 is a top view of a circuit board of a computer interface card of FIG. 1.
Figure 4:
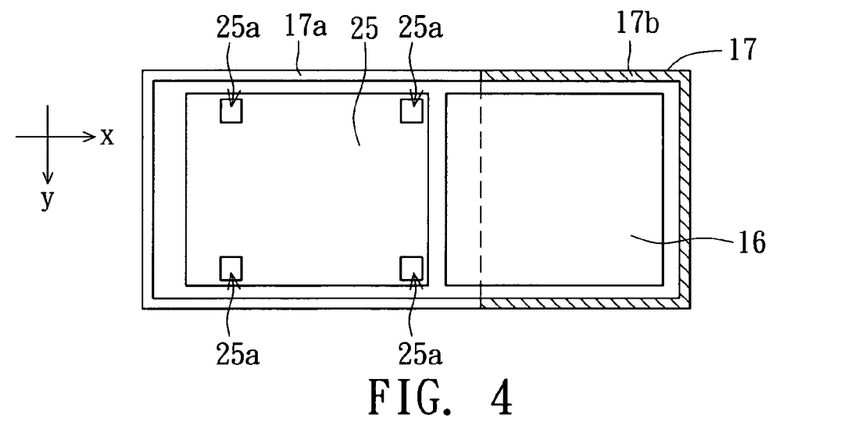
FIG. 4 is a bottom view of a cover of a computer interface card of FIG. 1.
Figure 5:
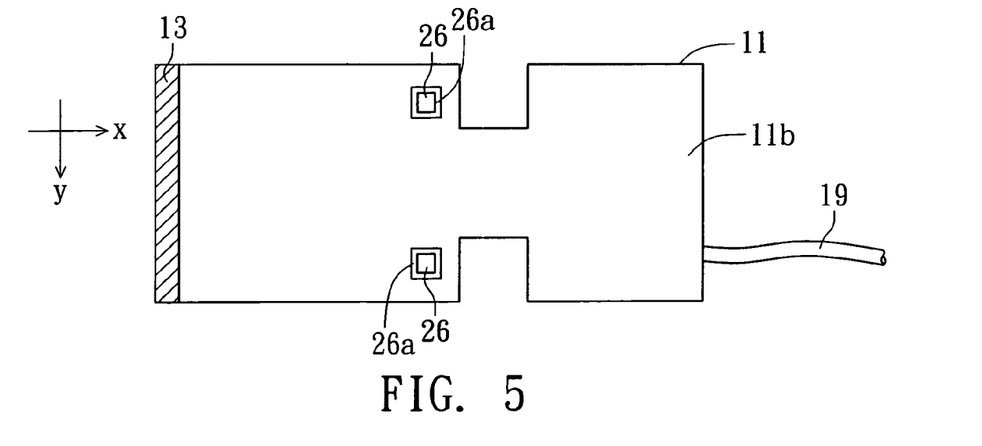
FIG. 5 is a bottom view of a circuit board of a computer interface card of FIG. 1.
Figure 6:
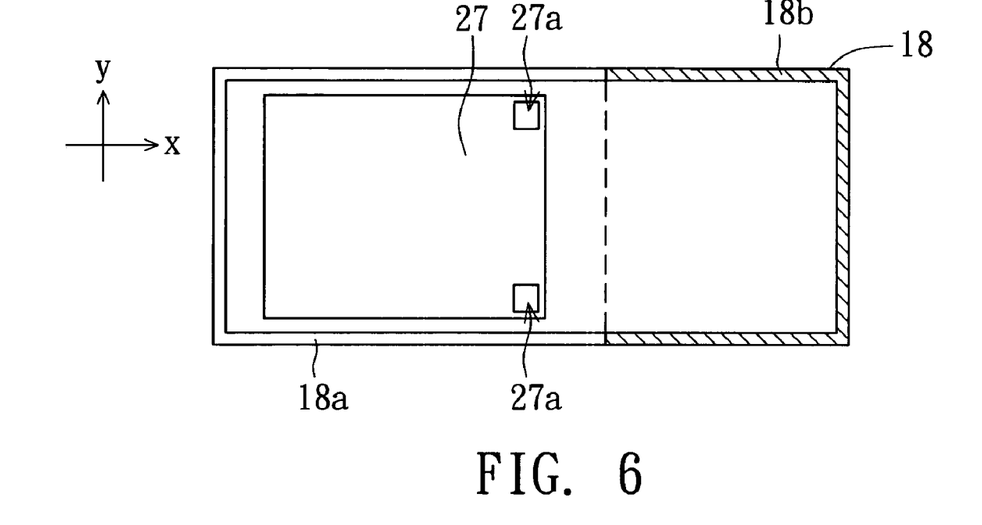
FIG. 6 is a top view of a base of a computer interface card of FIG. 1.
Figure 7:
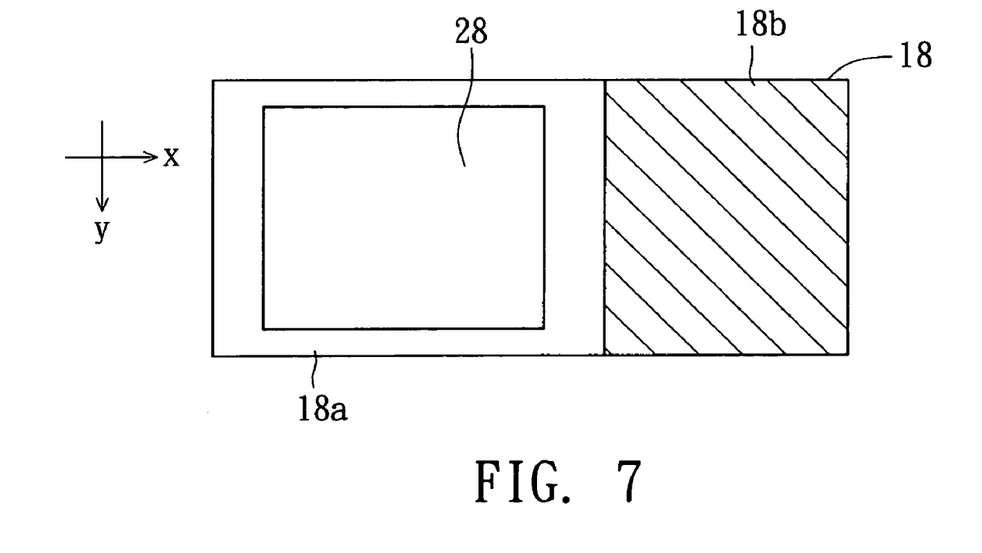
FIG. 7 is a bottom view of a base of a computer interface card of FIG. 1.

Refer to FIGS. 1~7. FIG. 1 is a cross-sectional disassembly diagram of a computer interface card and a computer according to a first embodiment of the invention. FIG. 2 is a cross-sectional assembly diagram of a computer interface card and a computer according to a first embodiment of the invention. FIG. 3 is a top view of a circuit board of a computer interface card of FIG. 1. FIG. 4 is a bottom view of a cover of a computer interface card of FIG. 1. FIG. 5 is a bottom view of a circuit board of a computer interface card of FIG. 1. FIG. 6 is a top view of a base of a computer interface card of FIG. 1. FIG. 7 is a bottom view of a base of a computer interface card of FIG. 1. In FIGS. 1~2, the computer interface card 10 disclosed in the present embodiment at least connects a cable 19 and a computer 20, and receives an analog or digital audio/video (AV) signal via the cable 19. After the processing of modulation and AV decoding, the computer interface card 10 outputs a digital AV signal to the computer 20. The computer 20 can play the received digital AV signal such as MEPG or MEPG 2 AV signal. The structure of and the electrical connection between the computer interface card 10 and the computer 20 are disclosed below. The structure of the computer interface card 10 is exemplified together with partial structure of the electrical connection between the computer 20 and the computer interface card 10. In the present embodiment, the computer interface card 10 and the computer 20 are respectively exemplified by a TV card and the structure of a notebook computer. However the technology of the present embodiment is not limited thereto.

As shown in FIGS. 1~2, the computer interface card 10 at least comprises a circuit board 11, a first connector 12, a second connector 13, a number of first upper conductors 14, a second upper conductor 15, a third upper conductor 16, a cover 17 and a base 18. The circuit board 11 has an upper surface 11a and a lower surface 11b. The first connector 12 is disposed on one side of the circuit board 11 to be electrically connected to a cable 19, a TV cable for instance, so that the first connector 12 can receive a TV signal via the cable 19. In the present embodiment, the cable 19 can be hot-plugged to be electrically connected to the first connector 12, so that the first connector 12 can receive the TV signal via the cable 19. The first connector 12 can be disposed on the upper surface 11a or the lower surface 11b of the circuit board 11. In the present embodiment, the first connector 12 is disposed on the upper surface 11a and is adjacent to one side of the circuit board 11.

The second connector 13 is disposed on the opposite side of the circuit board 11 to be electrically connected to a third connector 21 of the computer 20 and the first connector 12. For example, the second connector 13 can be hot-plugged to be electrically connected to the third connector 21. The signal transmitting interface between the second connector 13 and the third connector 21 comprises a PCMCIA, a Card Bus or an Express Card Bus interface. Moreover, the layout design with an inner circuit being disposed on the circuit board 11 enables the first connector 12 to be electrically connected to the second connector 13 via the inner circuit of the circuit board 11.

Besides, the computer 20 has a slot 22 and a plastic housing 24. The slot 22 and the third connector 21 are all disposed in the plastic housing 24, while the upper surface of the plastic housing 24 can have a keyboard and a touch pad disposed thereon. The slot 22 has a slot bottom 22a and a metal slot wall 22b. The metal slot wall 22b and the entire metal shell of the computer 20 can be electrically connected together or form a one-piece structure. The slot bottom 22a has the third connector 21 disposed thereon, while the slot 22 forms an opening 22c on a side surface of the plastic housing 24. Therefore, part of the structure of the computer interface card 10 enters and exits the slot 22 of the computer 20 along the ±x direction of FIGS. 1~2, so that the second connector 13 can be hot-plugged to be electrically connected to the third connector 21.

As shown in FIG. 3, the first upper conductors 14 are correspondingly disposed on the upper surface 11a of the circuit board 11 to be electrically connected to the grounding end (GND) of the circuit board 11. The number of the first upper conductors 14 can be five for instance. The second upper conductor 15 is disposed on the metal shell of the first connector 12 to be electrically connected to the metal shell of the first connector 12. The second upper conductor 15 can be a conductive sponge for instance. In FIG. 3, the computer interface card 10 further comprises a number of upper metal pads 14a. The number of the upper metal pads 14a can be five for instance. The upper metal pads 14a are disposed on the upper surface 11a of the circuit board 11 for the first upper conductors 14 to be electrically connected to the grounding end of the circuit board 11. The upper metal pads 14a have the first upper conductors 14 correspondingly disposed thereon. The formation of the upper metal pads 14a can be achieved by performing tin exposure step on the upper surface 11a of the circuit board 11 to complete a number of upper metal pads 14a which are tin pads for instance.

Further shown in FIGS. 1~2, the cover 17 and the base 18 are buckled together to retain the circuit board 11 and expose part of the first connector 12 and the second connector 13, so that the first connector 12 and the second connector 13 can be respectively electrically connected to the cable 19 and the third connector 21 of the computer 20. The cover 17 has an upper metal cover 17a and an upper insulating cover 17b. The base 18 has a lower metal base 18a corresponding to the upper metal cover 17a and a lower insulating base 18b corresponding to the upper insulating cover 17b. The upper metal cover 17a is electrically connected to the first upper conductor 14 and the lower metal base 18a. The connection between the upper metal cover 17a and the upper insulating cover 17b corresponds to the connection between the lower metal base 18a and the lower insulating base 18b. Furthermore, one of the first upper conductors 14 corresponds to both the connection between the upper metal cover 17a and the upper insulating cover 17b and the connection between the lower metal base 18a and the lower insulating base 18b. In the present embodiment, the particular first upper conductor 14, which corresponds to both the connection between the upper metal cover 17a and the upper insulating cover 17b and the connection between the lower metal base 18a and the lower insulating base 18b, can be a conductive sponge for instance, while the remaining four first upper conductors 14, which are electrically connected to the upper metal cover 17a and are symmetric both left vs. right and top vs. bottom, can be four metal elastic pieces for instance. In one embodiment, the insulating cover 17b and the insulating base 18b can be a plastic cover and a plastic base, respectively.

As shown in FIG. 4, the third upper conductor 16 is disposed on the inner surface of the upper insulating cover 17b and extends to the inner surface of the upper metal cover 17a to be electrically connected to the upper metal cover 17a and the second upper conductor 15. Moreover, the third upper conductor 16 can be a conductive cloth which is pasted on part of the inner surface of the cover 17, an end of the third upper conductor 16 is electrically connected to the second upper conductor 15, while another end of the third upper conductor 16 is electrically connected to the upper metal cover 17a and a first upper conductor 14 corresponding to the connection between the upper metal cover 17a and the upper insulating cover 17b. In FIG. 4, in order to prevent the upper metal cover 17a from erroneously contacting any electrical parts or circuits other than the first upper conductor 14, the computer interface card 10 further comprises an upper mylar 25. The upper mylar 25 is disposed on part of the inner surface of the upper metal cover 17a and has a number of upper apertures 25a. The number of the upper apertures 25a can be four for instance. The upper apertures 25a enable four left and right symmetric first upper conductors 14 to be electrically connected to the upper metal cover 17a. The upper mylar 25 can be further extended to the third upper conductor 16 and further has two apertures. One aperture is for a particular first upper conductor 14 corresponding to the connection between the upper metal cover 17a and the upper insulating cover 17b to pass through to be electrically connected to the third upper conductor 16 and the upper metal cover 17a, while another aperture is for the second upper conductor 15 to pass through to be electrically connected to the third upper conductor 16.

As shown in FIGS. 1, 2 and 5, the computer interface card 10 further comprises a number of first lower conductors 26. The number of the first lower conductors 26 can be two for instance. The two first lower conductors 26, which are symmetric top vs. bottom, are correspondingly disposed on the lower surface 11b to be electrically connected to the grounding end of the circuit board 11 and the lower metal base 18a. Moreover, the computer interface card 10 further comprises a number of lower metal pads 26a. The number of the upper metal pads 26a can be two. The lower metal pads 26a are disposed on the lower surface 11b for the first lower conductors 26 to be electrically connected to the grounding end of the circuit board 11. The lower metal pads 26a have the first lower conductors 26 correspondingly disposed thereon. The formation of the lower metal pads 26a can be achieved by performing tin exposure step on the lower surface 11b of the circuit board 11 to complete a number of lower metal pads 26a which are tin pads.

As shown in FIGS. 1, 2 and 6, in order to prevent the lower metal base 18a from erroneously contacting any electrical parts or circuits other than the first lower conductor 26, the computer interface card 10 further comprises a lower mylar 27. The upper mylar 27 is disposed on part of the inner surface of the lower metal base 18a and has a number of lower apertures 27a. The number of the lower apertures 27a can be two for instance. The lower apertures 27a are for the first lower conductors 26, which are symmetric top vs. bottom, to be electrically connected to the lower metal base 18a.

As shown in FIGS. 1, 2 and 7, for the upper metal cover 17a and the lower metal base 18a to be electrically connected to the metal slot wall 22b of the slot 22, the computer interface card 10 further comprises a second lower conductor 28 disposed on the outer surface of the lower metal base 18a to be electrically connected to the lower metal base 18a. When the second connector 13 is electrically connected to the third connector 21 of the computer 20, the second lower conductor 28 is electrically connected to the metal slot wall 22b. Moreover, the connection between the upper metal cover 17a and the upper insulating cover 17b, and the connection between the lower metal base 18a and the lower insulating base 18b, and a first upper conductor 14 respectively correspond to the opening 22c of the slot 22, so that the upper metal cover 17a and the lower metal base 18a are positioned in the slot 22 and that the upper insulating cover 17b and the lower insulating base 18b are exposed outside the opening 22c of the slot 22.

However, anyone who is skilled in the technology of the present embodiment will understand that the technology of the present embodiment is not limited thereto. For example, the upper metal cover 17a, the lower metal base 18a, and the metal slot wall 22b include cobalt, nickel, iron, gold, silver, copper, aluminum or tin and any combination thereof. The upper metal pads 14a and the lower metal pads 26a include tin, gold, silver, copper, aluminum, cobalt or nickel and any combination thereof. The first upper conductor 14, the second upper conductor 15, the third upper conductor 16, the first lower conductor 26 and the second lower conductor 28 include a metal, a conductive elastic body, a conductive elastic piece, a conductive spring, a conductive cloth or a conductive sponge and any combination thereof.

In present embodiment, the grounding end of the circuit board 11, the first upper conductor 14, the first lower conductor 26, the upper metal cover 17a, the lower metal base 18a, the second lower conductor 28 and the metal slot wall 22b are designed to be mutually and electrically connected, thus shortening the return path of the noises of the computer 20, reducing the amount of electromagnetic interference (EMI) radiation radiated via the cable 19, and enabling the noises to be guided back to the computer 20 when on the computer interface card 10.

According to the present embodiment, the design for the first connector 11, the second upper conductor 15, the third upper conductor 16, the upper metal cover 17a, the lower metal base 18a, the second lower conductor 28 and the metal slot wall 22b to be mutually and electrically connected enables the EMI radiation to be guided back to the computer 20 before being radiated via the cable 19. The above practice not only prevents the computer noises from being carried away from the computer 20 by the cable 19 and being built up on the computer 20, but also prevents the cable from causing EMI problem, thus complying with the required standards.

Second Embodiment

Figure 8:
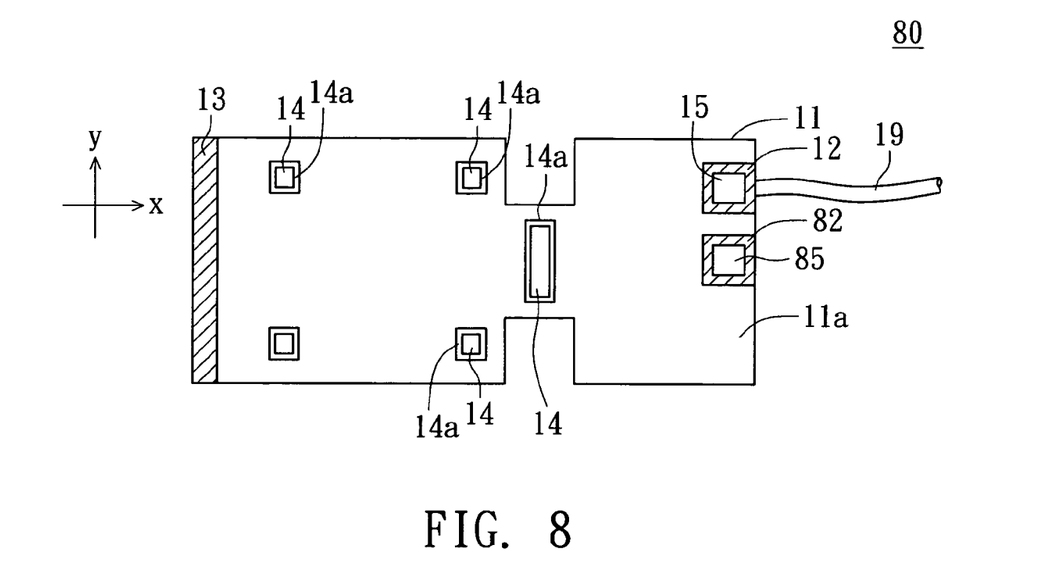
FIG. 8 is a top view of a circuit board of a computer interface card according to a second embodiment of the invention.

Referring to FIG. 8, a top view of a circuit board of a computer interface card according to a second embodiment of the invention is shown. In FIG. 8, the computer interface card 80 of the present embodiment differs with the computer interface card 10 of the first embodiment in that the present embodiment further has a fourth connector 82 and a fourth upper conductor 85 disposed on the upper surface 11a of the circuit board 11. As for the remaining elements which are the same and follow the same numbering are not repeated here.

As shown in FIG. 8, the fourth connector 82 is adjacent to the first connector 12 and is electrically connected to the second connector 13 via the inner circuit of the circuit board 11. The fourth upper conductor 85, which is disposed on the metal shell of the fourth connector 82, is a conductive sponge for instance. When the cover 17 and the base 18 of FIGS. 4~5 are buckled together to retain the circuit board 11 of FIG. 8, part of the fourth connector 82 can be exposed outside the cover 17 and the base 18. The fourth upper conductor 85 is electrically connected to the third upper conductor 16 of FIG. 4.

However, anyone who is skilled in the technology of the present embodiment will understand that the technology of the invention is not limited thereto. For example, the signal transmitting interface of the fourth connector 82 can comprise a universal serial bus (USB) interface or an IEEE 1394 bus interface. The fourth connector 82 can be externally connected to an extension adaptor of a USB or an IEEE 1394. The extension adaptor can be electrically connected to an electronic device with a USB or an IEEE 1394 such as a handy drive, a recorder pen or an MP3 player. Or, the fourth connector 82 can be electrically connected to an S video signal line, a V video signal line or a left and right audio signal line. The fourth connector 82 can be externally connected to an extension adaptor with an S video signal line, a V video signal line or a left and right audio signal line. The extension adaptor can be electrically connected to an AV output device such as a TV game station, a digital still cameral, a digital video recorder, a video player, a VCD player or a DVD player. Moreover, the fourth upper conductor 85 can comprise a metal, a conductive elastic body, a conductive elastic piece, a conductive spring, conductive cloth or a conductive sponge.

In the present embodiment, the first connector 11, the fourth connector 84, the second upper conductor 15, the third upper conductor 16, the fourth upper conductor 85, the upper metal cover 17a, the lower metal base 18a, the second lower conductor 28 and the metal slot wall 22b are designed to be mutually and electrically connected, so that the EMI radiation is guided back to the computer before being radiated via the cable 19. The practice not only prevents the computer noises from being carried away from the computer by the cable 19 then built-up on the cable 19, but also prevents the cable 19 from causing EMI problem, thus complying with the required standards.

Third Embodiment

Figure 9:
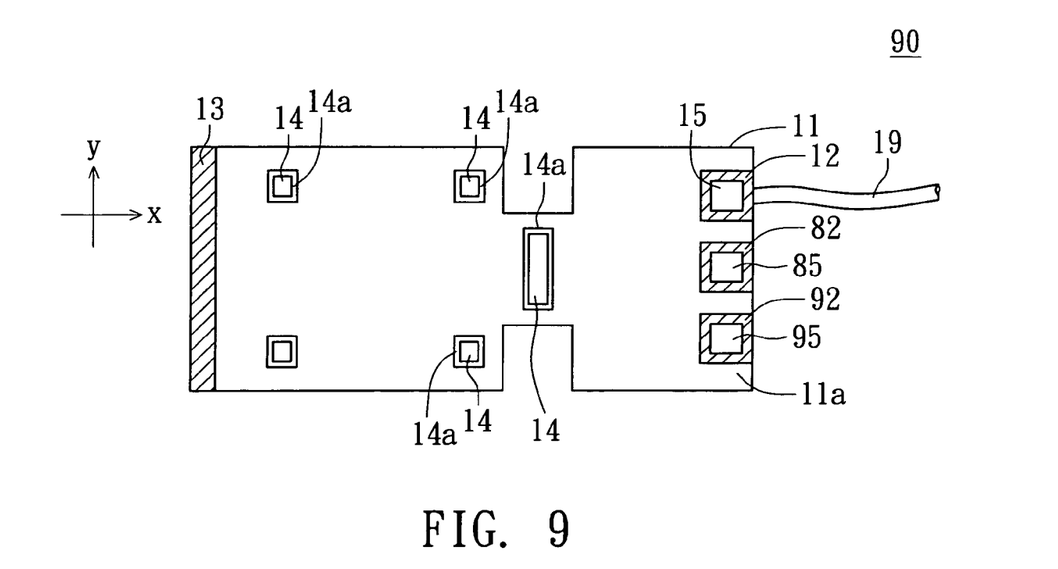
FIG. 9 is a top view a circuit board of a computer interface card of according to a third embodiment of the invention.

Referring to FIG. 9, a top view of a circuit board of a computer interface card of according to a third embodiment of the invention is shown. In FIG. 9, the computer interface card 90 of the present embodiment differs with the computer interface card 80 of the second embodiment in that the present embodiment further has a fifth connector 92 and a fifth upper conductor 95 disposed on the upper surface 11a of the circuit board 11. As for the remaining elements which are the same and follow the same numbering are not repeated here.

As shown in FIG. 9, the fifth connector 92 is adjacent to the fourth connector 82 and is electrically connected to via the inner circuit of the circuit board 11 and the second connector 13. The fifth upper conductor 95 is disposed on the metal shell of the fifth connector 82, such as a conductive sponge for instance. When the cover 17 and the base 18 of FIGS. 4~5 are buckled together to retain the circuit board 11 of FIG. 9, part of the fifth connector 92 can be exposed outside the cover 17 and the base 18, while the fifth upper conductor 95 is electrically connected to the third upper conductor 16 of FIG. 4.

However, anyone who is skilled in the technology of the present embodiment will understand that the technology of the present embodiment is not limited thereto. For example, the signal transmitting interface of the fourth connector 82 can comprise a universal serial bus (USB) interface or an IEEE 1394 bus interface. The fourth connector 82 can be externally connected to an extension adaptor of a USB or an IEEE 1394. Moreover, the fifth connector 92 can be electrically connected to an S video signal line, a V video signal line or a left and right audio signal line; the fifth connector 92 can be externally connected to an extension adaptor with an S video signal line, a V video signal line or left and right audio signal line. Moreover, the fifth upper conductor 95 can comprise a metal, a conductive elastic body, a conductive elastic piece, a conductive spring, conductive cloth or a conductive sponge.

In the present embodiment, the first connector 11, the fourth connector 84, the fifth connector 85, the second upper conductor 15, the third upper conductor 16, the fourth upper conductor 85, the fifth upper conductor 95, the upper metal cover 17a, the lower metal base 18a, the second lower conductor 28 and the metal slot wall 22b are designed to be mutually and electrically connected, so that the EMI radiation is guided back to the computer before being radiated via the cable 19. The practice not only prevents the computer noises from being carried away from the computer by the cable 19 then built-up on the cable 19, but also prevents the cable 19 from causing EMI problem, thus complying with the required standards.

Fourth Embodiment

Figure 10:
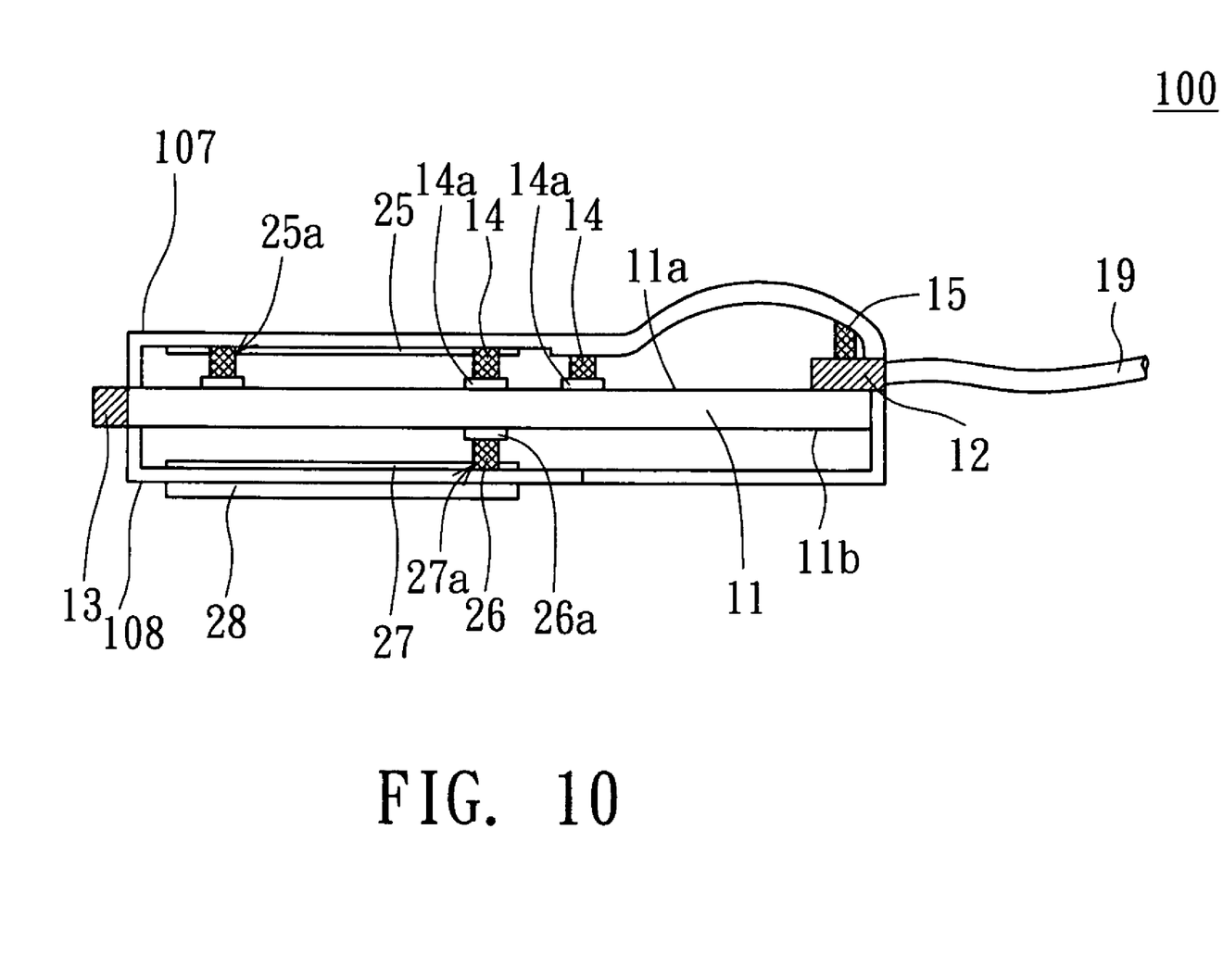
FIG. 10 is a sectional view of a computer interface card according to a fourth embodiment of the invention.

Referring to FIG. 10, a sectional view of a computer interface card according to a fourth embodiment of the invention is shown. The computer interface card 100 of the present embodiment differs with the computer interface card 10 of the first embodiment in that a metal cover 107 and a metal base 108 are added, but the third upper conductor 16 is omitted. As for the remaining elements which are the same and follow the same numbering are not repeated here.

In FIG. 10, the metal cover 107 and the metal base 108 are buckled together to retain the circuit board 10 with part of the first connector 12 and the second connector 13 being exposed. The metal cover 107 is electrically connected to the metal base 108, the first upper conductors 14 and the second upper conductor 15. Moreover, the metal cover 107 and the metal base 108 comprise cobalt, nickel, iron, gold, silver, copper, aluminum or tin and any combination thereof.

However, anyone who is skilled in the technology of the present embodiment will understand that the technology of the present embodiment is not limited thereto. For example, a fourth connector 82 and a fourth upper conductor 85 can be disposed on the circuit board 10 as shown in FIG. 8. Therefore, the fourth connector 82 can be exposed outside the metal cover 107 and the metal base 108, and the fourth upper conductor 85 is electrically connected to the metal cover 107. The signal transmitting interface of the fourth connector 82 can comprise a universal serial bus (USB) interface or an IEEE 1394 bus interface. The fourth connector 82 can be externally connected to an extension adaptor of a USB or an IEEE 1394. Or, the fourth connector 82 can be electrically connected to an S video signal line, a V video signal line or a left and right audio signal line; the fourth connector 82 can be externally connected to an extension adaptor with an S video signal line, a V video signal line or a left and right audio signal line.

Moreover, the circuit board 10 can further have the fourth connector 82, the fifth connector 92, the fourth upper conductor 85 and the fifth upper conductor 95 disposed thereon as shown in FIG. 9. Therefore, the fourth connector 82 and the fifth connector 92 can have partial structure exposed outside the metal cover 107 and the metal base 108, while the fourth upper conductor 85 and the fifth upper conductor 95 are electrically connected to the metal cover 107. The signal transmitting interface of the fourth connector 82 can comprise a universal serial bus (USB) interface or an IEEE 1394 bus interface. The fourth connector 82 can be externally connected to an extension adaptor of a USB or an IEEE 1394. Besides, the fifth connector 92 can be electrically connected to an S video signal line, a V video signal line or a left and right audio signal line; the fifth connector 92 can be externally connected to an extension adaptor with an S video signal line, a V video signal line or a left and right audio signal line.

In the present embodiment, the grounding end of the circuit board 11, the first upper conductor 14, the first lower conductor 26, the metal cover 107, the metal base 108, the second lower conductor 28 and the metal slot wall 22b are designed to be mutually and electrically connected, thus shortening the return path of the noises of the computer 20, reducing the amount of electromagnetic interference (EMI) radiation radiated via the cable 19, and enabling the noises to be guided back to the computer 20 when on the computer interface card 10.

In the present embodiment, the first connector 11, the second upper conductor 15, the third upper conductor 16, the metal cover 107, the metal base 108, the second lower conductor 28 and the metal slot wall 22b are designed to be mutually and electrically connected, so that the EMI radiation is guided back to the computer before being radiated via the cable 19. The practice not only prevents the computer noises from being carried away from the computer by the cable 19 then built-up on the cable 19, but also prevents the cable 19 from causing EMI problem, thus complying with the required standards.

According to the computer interface card disclosed in the above embodiments of the invention, the grounding end of the circuit board, the upper conductor, the metal cover, the metal base, the lower conductor and the metal slot wall are designed to be mutually and electrically connected, thus shortening the return path of the noises of the computer, reducing the amount of electromagnetic interference (EMI) radiation radiated via the cable, and enabling the noises to be guided back to the computer when on the computer interface card. Moreover, in the present embodiment, the connector, the upper conductor, the upper metal cover, the lower metal base, the lower conductor and the metal slot wall are designed to be mutually and electrically connected, so that the EMI radiation is guided back to the computer before being radiated via the cable. The practice not only prevents the computer noises from being carried away from the computer by the cable then built-up on the cable, but also prevents the cable from causing EMI problem, thus complying with the required standards.

The above embodiments are exemplified by a TV card and a notebook computer, however, the technology of the present embodiment is not limited thereto. The above embodiments and technology which solve the EMI problem for the cable can also be applied to other electronic devices, which use a PCMCIA, a Card Bus or an Express Card Bus interface, such as a computer interface card of other models. The connector, the circuit board, the metal cover and the metal base can have the design of a noise feedback path, not only preventing the computer noises from being carried away from the computer by the cable then built-up on the cable, but also preventing the cable from causing EMI problem, thus complying with the required standards.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer interface card, comprising:
   a circuit board having an upper surface and a lower surface;
   a first connector disposed on one side of the circuit board to be electrically connected to a cable;
   a second connector disposed on the opposite side of the circuit board to be electrically connected to a third connector of a computer and the first connector, wherein the signal transmitting interface between the second connector and the third connector comprises a PCMCIA, a Card Bus or an Express Card Bus interface;
   a plurality of first upper conductors disposed on the upper surface of the circuit board to be electrically connected to the grounding end of the circuit board;
   a second upper conductor disposed on the metal shell of the first connector to be electrically connected to the metal shell of the first connector;
   a cover and a base, which are buckled together to retain the circuit board and expose part of the first connector and the second connector, wherein the cover has an upper metal cover and an upper insulating cover, the base has a lower metal base corresponding to the upper metal cover and a lower insulating base corresponding to the upper insulating cover, wherein the upper metal cover is electrically connected to the first upper conductors and the lower metal base; and
   a third upper conductor disposed on the inner surface of the upper insulating cover to be electrically connected to the upper metal cover and the second upper conductor.

2. The computer interface card according to claim 1, further comprising:
a plurality of first lower conductors disposed on the lower surface of the circuit board to be electrically connected to the grounding end of the circuit board and the lower metal base.

3. The computer interface card according to claim 1, further comprising:
a fourth connector disposed on the upper surface of the circuit board and electrically connected to the second connector, wherein the fourth connector can be exposed outside the cover and the base, the signal transmitting interface of the fourth connector comprises a universal serial bus (USB) interface or an IEEE 1394 bus interface.

4. The computer interface card according to claim 2, further comprising:
a plurality of upper metal pads disposed on the upper surface of the circuit board for the first upper conductors to be electrically connected to the grounding end of the circuit board, wherein the first upper conductors are correspondingly disposed on the upper metal pads; and
a plurality of lower metal pads disposed on the lower surface of the circuit board for the first lower conductors to be electrically connected to the grounding end of the circuit board, wherein the first lower conductors are correspondingly disposed on the upper metal pads.

5. The computer interface card according to claim 2, further comprising:
an upper mylar, which is disposed on part of the inner surface of the upper metal cover and has a plurality of upper apertures, wherein the upper apertures are for the first upper conductors to be electrically connected to the upper metal cover; and
a lower mylar, which is disposed on part of the inner surface of the lower metal base and has a plurality of lower apertures, wherein the lower apertures are for the first lower conductors to be electrically connected to the lower metal base.

6. The computer interface card according to claim 2, wherein the computer has a slot, which has a slot bottom and a metal slot wall, the slot bottom has the third connector disposed thereon, wherein the computer interface card further comprises:
a second lower conductor disposed on the outer surface of the lower metal base to be electrically connected to the lower metal base, wherein the second lower conductor is electrically connected to the metal slot wall when the second connector is electrically connected to the third connector of the computer.

7. The computer interface card according to claim 3, further comprising:
a fourth upper conductor disposed on the metal shell of the fourth connector to be electrically connected to the third upper conductor.

8. The computer interface card according to claim 3, further comprising:
a fifth connector disposed on the upper surface of the circuit board and electrically connected to the second connector, wherein the fifth connector, which can be exposed outside the cover and the base, is electrically connected to an S video signal line, a V video signal line or a left and right audio signal line.

9. The computer interface card according to claim 6, wherein the connection between the upper metal cover and the upper insulating cover, and the connection between the lower metal base and the lower insulating base correspond to the opening of the slot when the second connector is electrically connected to the third connector of the computer, so that the upper metal cover and the lower metal base are positioned inside the slot, and the upper insulating cover and the lower insulating base are exposed outside the slot.

10. The computer interface card according to claim 8, further comprising:
a fifth upper conductor disposed on the metal shell of the fifth connector to be electrically connected to the third upper conductor.

11. The computer interface card according to claim 9, wherein one of the first upper conductors corresponds to the connection between the upper metal cover and the upper insulating cover.

12. A computer interface card, comprising:
a circuit board having an upper surface and a lower surface;
a first connector disposed on one side of the circuit board to be electrically connected to a second connector of a computer, wherein the signal transmitting interface between the first connector and the second connector comprises a PCMCIA, a Card Bus or an Express Card Bus interface;
a plurality of first upper conductors disposed on the upper surface of the circuit board to be electrically connected to the grounding end of the circuit board; and
a cover and a base, which are buckled together to retain the circuit board and expose part of the first connector, wherein the cover has an upper metal cover and an upper insulating cover, the base has a lower metal base corresponding to the upper metal cover and a lower insulating base corresponding to the upper insulating cover, wherein the upper metal cover is electrically connected to the first upper conductors and the lower metal base.

13. The computer interface card according to claim 12, further comprising:
a plurality of first lower conductors disposed on the lower surface of the circuit board to be electrically connected to the grounding end of the circuit board and the lower metal base.

14. The computer interface card according to claim 12, further comprising:
a third connector disposed on the opposite side of the circuit board and electrically connected to the first connector, wherein the third connector is electrically connected to a cable;
a second upper conductor disposed on the metal shell of the third connector to be electrically connected to the metal shell of the third connector; and
a third upper conductor disposed on the inner surface of the upper insulating cover to be electrically connected to the upper metal cover and the second upper conductor.

15. The computer interface card according to claim 13, wherein the computer has a slot, which has a slot bottom and a metal slot wall, the slot bottom has the second connector disposed thereon, the computer interface card further comprises:
a second lower conductor disposed on the outer surface of the lower metal base to be electrically connected to the lower metal base, wherein the second lower conductor is electrically connected to the metal slot wall when the first connector is electrically connected to the second connector of the computer.

16. A computer interface card, comprising:
 a circuit board having an upper surface and a lower surface;
 a first connector disposed on one side of the circuit board to be electrically connected to a cable;
 a first upper conductor disposed on the metal shell of the first connector to be electrically connected to the metal shell of the first connector;
 a cover and a base, which are buckled together to retain the circuit board and expose part of the first connector, wherein the cover has an upper metal cover and an upper insulating cover, the base has a lower metal base corresponding to the upper metal cover and a lower insulating base corresponding to the upper insulating cover, wherein the upper metal cover is electrically connected to the lower metal base; and
 a second upper conductor disposed on the inner surface of the upper insulating cover to be electrically connected to the upper metal cover and the second upper conductor.

17. The computer interface card according to claim 16, further comprising:
 a second connector disposed on the opposite side of the circuit board to be electrically connected to a third connector of a computer and the first connector, wherein the signal transmitting interface between the second connector and the third connector comprises a PCMCIA, a Card Bus or an Express Card Bus interface; and
 a plurality of first lower conductors disposed on the lower surface of the circuit board to be electrically connected to the grounding end of the circuit board and the lower metal base.

18. The computer interface card according to claim 17, wherein the computer has a slot, which has a slot bottom and a metal slot wall, the slot bottom has the third connector disposed thereon, the computer interface card further comprises:
 a second lower conductor disposed on the outer surface of the lower metal base to be electrically connected to the lower metal base, wherein the second lower conductor is electrically connected to the metal slot wall when the second connector is electrically connected to the third connector of the computer.

19. The computer interface card according to claim 16, further comprising:
 a plurality of third upper conductors disposed on the upper surface of the circuit board to be electrically connected to the grounding end of the circuit board and the upper metal cover.

* * * * *